ELECTROLUMINESCENT CELLS CONTROLLED BY IMPEDANCE NETWORKS
Filed May 31, 1960

INVENTOR
HANS G. BLANK
BY [signature]
ATTORNEY

United States Patent Office 3,098,175
Patented July 16, 1963

3,098,175

ELECTROLUMINESCENT CELLS CONTROLLED BY IMPEDANCE NETWORKS

Hans G. Blank, New York, N.Y., assignor to General Telephone and Electronics Laboratories, Inc., a corporation of Delaware Filed May 31, 1960, Ser. No. 32,690
9 Claims. (Cl. 315—250)

Figure 1:
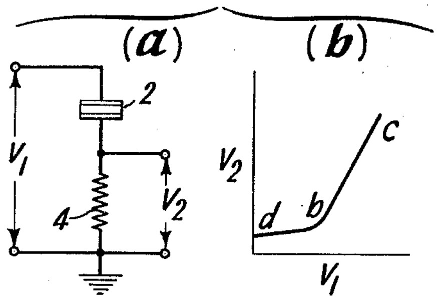

My invention relates to electronic switches.

I have invented a new type of electronic switch which, in response to an input voltage of variable value, produces an output voltage having a relatively high value when the input voltage values fall within a selected range, the output voltage being essentially zero when the input voltage values fall outside of this range. In contradistinction to known switches of this type, my switch employs only linear and non-linear resistive circuit elements and does not use any active circuit components such as tubes or transistors. Further, by supplying the input voltage to a plurality of such switches having input circuits connected in parallel, only a selected one or another of these switches will produce an output voltage of relatively high value, the switch selection being determined in accordance with the value of the input voltage. Moreover, if the output circuits of these switches are connected to individual electroluminescent devices, such as electroluminescent lamps, one or another of these lamps can be lit depending upon the value of the input voltages.

In accordance with the principles of my invention, my switch comprises first and second networks connected in parallel between first and second input terminals. Each network includes, in series connection, a first non-linear resistor, a linear resistance element, and a second non-linear resistor. (These non-linear resistors each have an electrical charcteristic at which the current flowing through the resistor is substantially proportional to the *n*th power of the voltage across the resistor, *n* being a positive number larger than one.) A first output terminal is connected to the junction of the element and the second resistor of the first network. A second output terminal is connected to the junction of the element and the second resistor of the second network. A variable input voltage is applied between the input terminals. Due to the electrical properties of the networks, when the input voltage values fall within a selected range, an output voltage having a relatively high value appears across the output terminals, the output voltage being essentially zero when the input voltage values fall outside of said range. When an electroluminescent device, such as an electroluminescent lamp, is connected across the output terminals, the lamp will be lit when the input voltage values fall within said range and will be extinguished when these voltage values fall outside of said range.

The input terminals of this switch can be connected in parallel with the input terminals of a plurality of additional switches. The electrical characteristics of each switch can be so chosen that a different selected range of input voltage values is associated with each switch. Under these conditions, when a variable input voltage is applied across the paralleled input terminals, an output voltage will appear across the output terminals of a selected switch (while all other output terminals remain at essentially the same potential). The switch selection is determined in accordance with the value of the input voltage.

When an electroluminescent lamp is connected across the output terminals of each switch, one or another lamp will be lit, the selection of the lamp to be lit being determined in accordance with the input voltage values.

Figure 2:
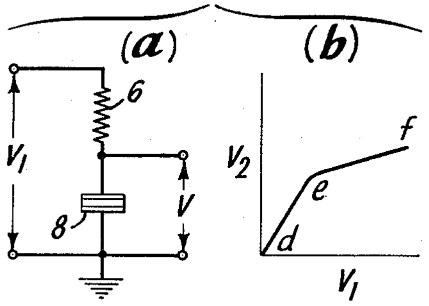
Figure 3:
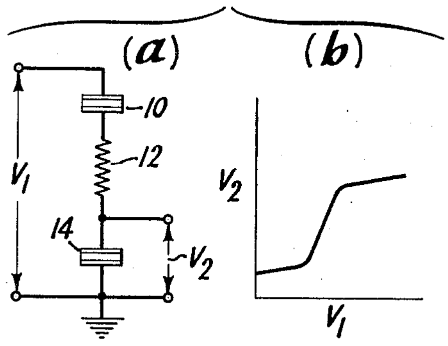
Figure 5:
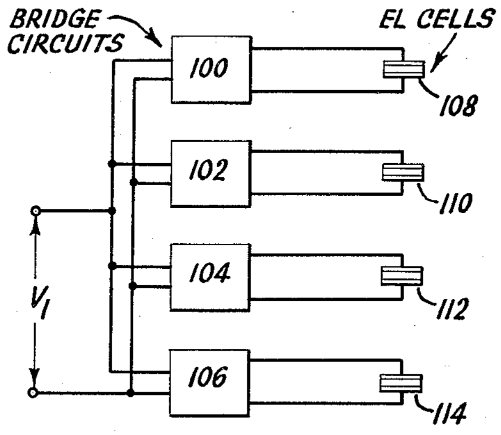
Figure 4:
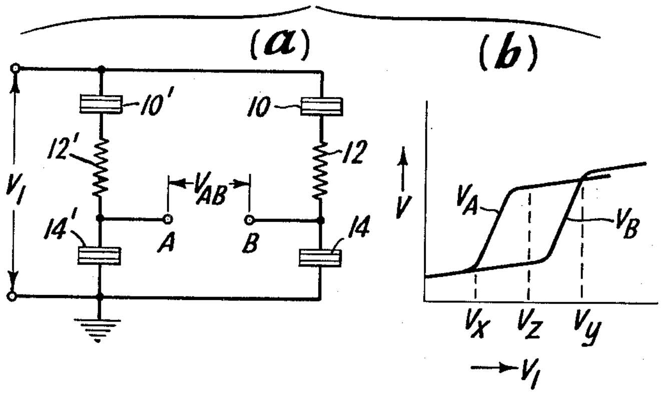

Illustrative embodiments of my invention will now be described with reference to the accompanying drawings, wherein:

FIGS. 1*a*, 2*a* and 3*a* are circuits utilizing combinations of linear resistance elements and non-linear resistors which embody certain principles employed for my invention;

FIGS. 1*b*, 2*b* and 3*b* are graphs of the voltage characteristics of the circuits of FIGS. 1*a*, 2*a* and 3*a* respectively;

FIG. 4*a* illustrates one device in accordance with my invention;

FIG. 4*b* is a graph of the voltage characteristics of the device of FIG. 4*a*; and FIG. 5 illustrates another device in accordance with my invention.

Referring now to FIG. 1*a*, a linear resistance element 2 and an electrically non-linear resistor 4 are connected in series between two terminals. An alternating voltage $V_1$ is applied between these terminals and an output voltage $V_2$ appears across the element 2.

The non-linear resistor 2 is formed, for example, of a layer of electrically non-linear material, subtended between two electrodes, as described in more detail in the copending patent application of Moe Wasserman, Serial No. 22,480, filed March 24, 1960. The non-linear characteristic of this resistor effectively satisfies the equation $I=KV^n$, where I is the current flowing through the resistor; V is the voltage across the resistor, K is a constant of proportionality, and *n* is a positive number which is always greater than one and can be, for example, as high as 16.

The relationship between the voltages $V_1$ and $V_2$ is shown graphically in FIG. 1*b*. It will be noted from FIG. 1*b* that, for low voltage values, voltages $V_1$ and $V_2$ are approximately proportional to each other. However, as the voltage values are further increased, the voltage $V_2$ begins to vary essentially the *n*th power of the voltage $V_1$. These two different relationships can be explained as follows.

Under A.-C. excitation the equivalent circuit of the non-linear resistor is represented by paralleled capacitive and resistive components. The capacitive component is linear and the resistive component is non-linear statisfying the equation $I=KV^n$. When the applied voltage is low, the resistive component is essentially short-circuited by the capacitive component. Under these conditions, the input and output voltages are essentially proportional to each other. However, when the applied voltage is increased, the resistive component drops very sharply in value and the capacitive component is essentially short-circuited by the resistive component. Since the resistive component is non-linear and is sharply reduced in value, the output voltage across the linear element increases far more rapidly than the input voltage and indeed the output voltage is substantially proportional to the *n*th power of the input voltage.

It will be noted that, under direct voltage excitation, the non-linear resistor will not have a capacitive component, and the voltage $V_2$ will be substantially proportional to the *n*th power of the voltage $V_1$ for all values of voltage $V_1$.

The device of FIG. 2*a* is essentially the same as that of FIG. 1*a* except that the positions of the linear resistance element and the non-linear resistor are interchanged. Under these conditions, the voltage relationships are shown in FIG. 2*b*. It will be noted that, as in FIG. 1 the voltage $V_2$ first varies linearly with respect to $V_1$, but thereafter begins to vary substantially as the *n*th root of $V_1$.

Referring now to FIG. 3*a*, a network consisting of a first non-linear resistor 10, a linear resistance element 12 and a second non-linear resistor 14 connected in series, is positioned between two terminals. An input voltage $V_1$ is applied between these terminals, and an output voltage $V_2$ appears across resistor 14. The resulting waveform is shown in FIG. 3*b*. It will be seen that at low voltage values $V_1$ and $V_2$ are essentially proportional; at intermediate values, $V_2$ is substantially proportional to the *n*th power of $V_1$; at higher values, $V_2$ is substantially proportional to the *n*th root of $V_1$. It will be noted that the network of FIG. 3*a* is formed by effectively disconnecting the ground connection to the bottom terminal of the circuit of FIG. 1*a* and then connecting this ungrounded terminal to the top terminal of the circuit of FIG. 2*b*, i.e. the circuit of FIG. 1*a* is effectively connected to the top of the circuit of FIG. 2*a*.

FIG. 4*a* shows two of the networks of FIG. 3*a* connected in parallel with one output terminal B connected to the junction of non-linear resistor 14 and linear element 12 and another output terminal A being connected to the junction of non-linear resistor 14′ and linear element 12′. The non-linear resistor 10 has a different break point (i.e. the voltage point at which the resistive current becomes more significant than the capacitive current) than that of the non-linear resistor 10′.

As a result, the voltage across resistor 14 as a function of the input voltage $V_1$ (curve $V_B$ in FIG. 4*b*) differs from the voltage across resistor 14′ as a function of the input voltage $V_1$ (curve $V_A$ in FIG. 4*b*). As a consequence, for values of voltage $V_1$ below voltage $V_x$ and above voltage $V_y$ in FIG. 4*b*, the voltage appearing between terminals A and B is essentially zero; i.e. terminals A and B are at essentially the same potential. However, at voltage values $V_z$ of $V_1$ intermediate values $V_x$ and $V_y$, the voltage appearing between terminals A and B attains a relatively high value.

Thus, the device of FIG. 4*a* functions as a bridge circuit, gate or switch.

FIG. 5 shows a plurality of the devices of FIG. 4*a* shown in block form as 100, 102, 104 and 106. Each of these devices, by suitable choice of component values, has a different selected range of input voltage values at which a relatively high output voltage is produced, the output voltage being essentially zero when the input voltage values fall outside of the selected range. An input voltage $V_1$ is applied to all devices in parallel. Consequently, an output voltage will appear at one or another of the devices 100, 102, 104 and 106, the particular device selection being determined in accordance with the value of the input voltage.

The outputs of each of devices 100, 102, 104 and 106 are connected to a corresponding one of electroluminescent cells or lamps 108, 110, 112 and 114. When an output voltage appears at any of these devices, the associated lamp will be lit and all other lamps will be extinguished.

For the mathematical relationships indicated above to be satisfied rigorously, the value of the linear element should be much smaller than that of the non-linear resistor (when this resistor functions as a resistive component). Under these conditions, the voltage drop across the element will be much smaller (for example 1%) than that across the resistor.

However, in many applications, it is not necessary for the relationships to be satisfied rigorously. Under these conditions, the voltage drops across the resistors and the elements can be of the same order of magnitude. For example, $V_1$ can be 300 volts, $V_{AB}$ can be 40 volts, $V_A$ can be 100 volts and $V_B$ can be 60 volts.

What is claimed is:

1. A circuit comprising first and second networks connected in parallel, each network including a linear resistance element and first and second electrically non-linear resistors, said element and said resistors being connected in series with said element being interposed between said resistors, each resistor having an electrical characteristic at which the current flowing through the resistor is substantially proportional to the *n*th power of the voltage across the resistor, *n* being a positive number in excess of one, said element being interposed between said resistor, said networks being connected between a pair of input terminals, and first and second output terminals, each output terminal being connected to the junction of said element and said second resistor of the corresponding network.

2. A circuit comprising first and second networks connected in parallel, each network including a linear resistance element and first and second electrically nonlinear resistors, said element and said resistors being connected in series with said element being interposed between said resistors, each resistor having an electrical characteristic at which the current flowing through the resistor is substantially proportional to the *n*th power of the voltage across the resistor, *n* being a positive number in excess of one, said element being interposed between said resistor, said networks being connected between a pair of input terminals, first and second output terminals, each output terminal being connected to the junction of said element and said second resistor of the corresponding network, and means to apply a variable input voltage between said input terminals, said first and second output terminals developing different potentials when said input voltage falls within a given voltage range and developing essentially equal potentials when the input voltage falls outside of said range.

3. A circuit comprising first and second networks connected in parallel, each network including a linear resistance element and first and second electrically non-linear resistors, said element and said resistors being connected in series with said element being interposed between said resistors, each resistor having an electrical charcteristic at which the current flowing through the resistor is substantially proportional to the *n*th power of the voltage across the resistor, *n* being a positive number in excess of one, said element being interposed between said resistors, first and second output terminals, each output terminal being connected to the junction of the elment and the second resistor in the corresponding network, and an electroluminescent device coupled betwen said output terminals.

4. A circuit comprising a plurality of circuit units, each unit including first and second networks connected in parallel between first and second input terminals, each network including a linear resistance element and first and second electrically non-linear resistors, said first resistor, said element and said second resistor being connected in series in the order named, each resistor having an electrical characteristic at which the current flowing through the resistor is substantially proportional to the *n*th power of the voltage across the resistor, *n* being a positive number in excess of one, all of said first terminals being interconnected, all of said second input terminals being interconnected.

5. A circuit comprising a plurality of circuit units, each unit including first and second networks connected in parallel between first and second input terminals, each network including a linear resistance element and first and second electrically non-linear resistors, said first resistor, said element and said second resistor being connected in series in the order named, each resistor having an electrical characteristic at which the current flowing through the resistor is susbtantially proportional to the *n*th power of the voltage across the resistor, *n* being a positive number in excess of one, all of said first input terminals being interconnected, all of said second input terminals being interconnected, and a like plurality of electroluminescent devices, each device being connected between the junction of the element and the second resistor of the first network and the junction of the second network of the corresponding circuit unit.

6. An electroluminescent device comprising a gate having an input circuit and an output circuit, said gate when a continuously variable input voltage is supplied to its input circuit producing an output voltage of finite value when the input voltage falls within a given range and producing an output voltage of essentially zero when the input voltage falls outside of said range, and an electroluminescent cell directly coupled to said output circuit, said cell being energized when said finite voltage is produced and being denergized when said input voltage falls outside of said range.

7. An electroluminescent device comprising a gate having an input circuit and an output circuit, said gate when a continuously variable input voltage is supplied to its input circuit producing an output voltage of finite value when the input voltage falls within a given range and producing an output voltage of essentially zero when the input voltage falls outside of said range, and an electroluminescent cell directly coupled to said output circuit, said cell being energized when said finite voltage is produced and being deenergized when said input voltage falls outside of said range, and means to supply said variable input voltage to said input circuit.

8. An electroluminescent display device comprising a plurality of electroluminescent cells, a like plurality of gates, each gate having an input circuit and an output circuit, each cell being directly coupled to the output circuit of the corresponding gate, the input circuits of all of said gates being connected in parallel, each gate responding to a variable input voltage applied to all input circuits simultaneously to produce an output voltage when the input voltage values fall within a given voltage range and producing essentially a zero output voltage when the input voltage values fall outside of said range, each gate having a different given voltage range.

9. An electroluminescent display device comprising a plurality of electroluminescent cells, a like plurality of gates, each gate having an input circuit and an output circuit, each cell being directly coupled to the output circuit of the corresponding gate, the input circuits of all of said gates being connected in parallel, each gate responding to a variable input voltage applied to all input circuits simultaneously to produce an output voltage when the input voltage values fall within a given range and producing essentially a zero output voltage when the input voltage values fall outside of said range, each gate having a different given range, and means to supply said variable input voltage to said paralleled input circuits.

References Cited in the file of this patent

UNITED STATES PATENTS

| | | |
|---|---|---|
| 2,087,316 | Doba | July 20, 1937 |
| 2,533,286 | Schmitt | Dec. 12, 1950 |
| 2,607,827 | Mennie | Aug. 19, 1952 |
| 2,774,813 | Livingston | Dec. 18, 1956 |
| 2,922,076 | Sack et al. | Jan. 19, 1960 |
| 2,960,613 | Spitzer | Nov. 15, 1960 |